United States Patent
Yelverton et al.

(10) Patent No.: US 6,332,348 B1
(45) Date of Patent: Dec. 25, 2001

(54) GAS FLOW CALIBRATION OF MASS FLOW CONTROLLERS

(75) Inventors: Mark E. Yelverton, Austin; Tom Timmons, Bastrop, both of TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/478,154

(22) Filed: Jan. 5, 2000

(51) Int. Cl.[7] .................................................. G01F 25/00
(52) U.S. Cl. .................................................. 73/1.34
(58) Field of Search .................................... 73/1.16, 1.27, 73/1.28, 1.34, 1.35, 1.36, 202.5, 197; 137/1, 487.5, 486, 468; 702/100

(56) References Cited

U.S. PATENT DOCUMENTS

| | | | |
|---|---|---|---|
| 3,148,527 | * 9/1964 | Lindquist et al. | 73/1.34 |
| 3,330,156 | * 7/1967 | Thomas | 73/197 |
| 5,648,605 | * 7/1997 | Takahashi | 73/197 |
| 5,744,695 | * 4/1998 | Forbes | 73/1.35 |

OTHER PUBLICATIONS

Wolf et al., *Silicon Processing for the VLSI Era*, vol. 1: Process Technology, © 1986 by Lattice Press, pp. 165–166.

* cited by examiner

*Primary Examiner*—Hezron Williams
*Assistant Examiner*—Jay L. Politzer
(74) *Attorney, Agent, or Firm*—Kevin L. Daffer; Conley, Rose & Tayon P.C.

(57) ABSTRACT

A method, system, and storage medium for gas flow calibration of mass flow controllers (MFCs) is presented. A second mass flow controller that has a full scale range substantially less than that of a mass flow meter (MFM) may be calibrated by the MFM using a "gas biasing" technique. A first MFC is set such that a first flow of gas through the MFM at a first flow rate results. The first flow rate is preferably approximately 50% of the full scale range of the MFM. A first reading of the MFM is then recorded. The second MFC is then set such that a second gas flow of gas through the MFM at a second flow rate results. A second reading of the MFM is then recorded. The difference between the second and first readings is then compared to the set flow rate of the second MFC to determine the calibration of the second MFC. The full scale range of the second MFC may be less than 1% of the full scale range of the MFM.

14 Claims, 4 Drawing Sheets

GAS FLOW CALIBRATION OF MASS FLOW CONTROLLERS

BACKGROUND OF THE INVENTION

1. Field of the Invention

This invention relates to semiconductor processing and, more particularly, to a method, system, and storage medium for gas flow calibration of mass flow controllers.

2. Description of the Relevant Art

Many process tools used in semiconductor fabrication require regulated flow of various gases into the process tool. Mass flow controllers ("MFCs") are ubiquitous in semiconductor fabrication for regulating the flow of gases into process tools. Each process tool typically has a gas tray which includes a MFC for each gas used by the process tool. Accurate processing often requires that the gas flow be carefully regulated. Failure to accurately control the gas flow may result in the fabrication of defective integrated circuits. To ensure accurate gas flow requires that the calibration of each MFC be checked on a regular basis. For example, the calibration may be checked as often as once every two weeks.

MFCs are often calibrated using mass flow meters (MFMs). The MFMs may be located in an external test rig which can be attached to the gas tray to calibrate the MFCs or, preferably, the MFMs may be located on the gas tray thereby allowing more frequent checks on the MFC calibrations. MFMs are typically only accurate between 5% and 95% of their full scale readings. Process tools, however, often require flow rates of different gases that differ by two or more orders of magnitudes. For example, process tools may have MFCs with full scale ranges of 20 slm and 200 sccm on the same gas tray. To calibrate a 20 slm MFC typically requires a 20 slm MFM, however, a 200 sccm MFC has a full scale range that is only 1% of the full scale range of the 20 slm MFM and, therefore, the 200 sccm can not be calibrated accurately using the 20 slm MFM directly. To calibrate both a 20 slm MFC and a 200 sccm MFC on the same gas tray requires the gas tray contain multiple MFMs. Having multiple MFMs on a gas tray increases the complexity and cost of the gas tray.

It is therefore desired to have a gas tray that requires only a single MFM on the gas tray to calibrate MFCs that have vastly different flow rates. It is also desired that the calibration be easy to perform quickly thereby allowing the calibration to performed more frequently.

SUMMARY OF THE INVENTION

The problems outlined above are in large part addressed by a method for gas flow calibration that involves "gas biasing" of a MFM to allow that MFM to be used to calibrate MFCs that have full scale ranges substantially less than the full scale range of the MFC. Calibrating a MFC using a MFM with a full scale range substantially greater than that of the MFC allows for gas trays with only a single MFM. Utilization of such a method allows gas trays to be produced having only a single MFM thereby advantageously reducing the cost of those gas trays. Additionally, such a gas tray implementing the calibration method recited herein allows all MFCs on the gas tray to be calibrated on a regular basis thereby ensuring accurate delivery of process gases to the process tool.

The method contemplated herein for calibrating a MFC having a full scale range substantially less than the full scale range of the MFM includes the utilization of two MFCs and a MFM. The first MFC has a full scale range substantially similar to that of the MFM. The second MFC, which is the MFC to be calibrated, has a full scale range substantially less than the full scale range of the MFM. The first MFC is already present on the gas tray and is also used for regulating the flow of a process gas to the process tool. The first MFC is used to "gas bias" the MFM. The first MFC is set such that a first gas flow through the MFM at a first flow rate results. The first flow rate is approximately 40% to 60% of the full scale range of the MFM and is preferably approximately 50% of the full scale range of the MFM, which corresponds to the flow rate at which MFMs are typically the most accurate. A first reading of the MFM is then recorded. The second MFC is then set such that a second gas flow of gas through the MFM at a second flow rate results. The second MFC may be set such that flow rate of gas through the second MFC is equal to the full scale range of the second MFC. A second reading of the MFM is then recorded. The difference between the second and first readings is then compared to the set flow rate of the second MFC to determine the calibration of the second MFC. The full scale range of the second MFC may be less than 1% of the full scale range of the MFM. This method may be repeated for the second MFC for different flow rates through the second MFC to determine the calibration of the second MFC over a range of flow rates.

A system, which includes a computer system, a MFM, and a plurality of MFCs, is contemplated herein for implementing the method described above. The system includes a database of the calibration of each of the plurality of MFCs. A program executing on the system controls the MFM and the MFCs to perform the method described above. The program may then modify the database of calibration results.

A computer-readable storage medium is also contemplated herein. The storage medium contains program instructions that can be implemented by a execution method to determine the calibration of a MFC according to the method described above. The storage medium also contains calibration data for the MFC.

BRIEF DESCRIPTION OF THE DRAWINGS

Other objects and advantages of the invention will become apparent upon reading the following detailed description and upon reference to the accompanying drawings in which.

Figure 1:
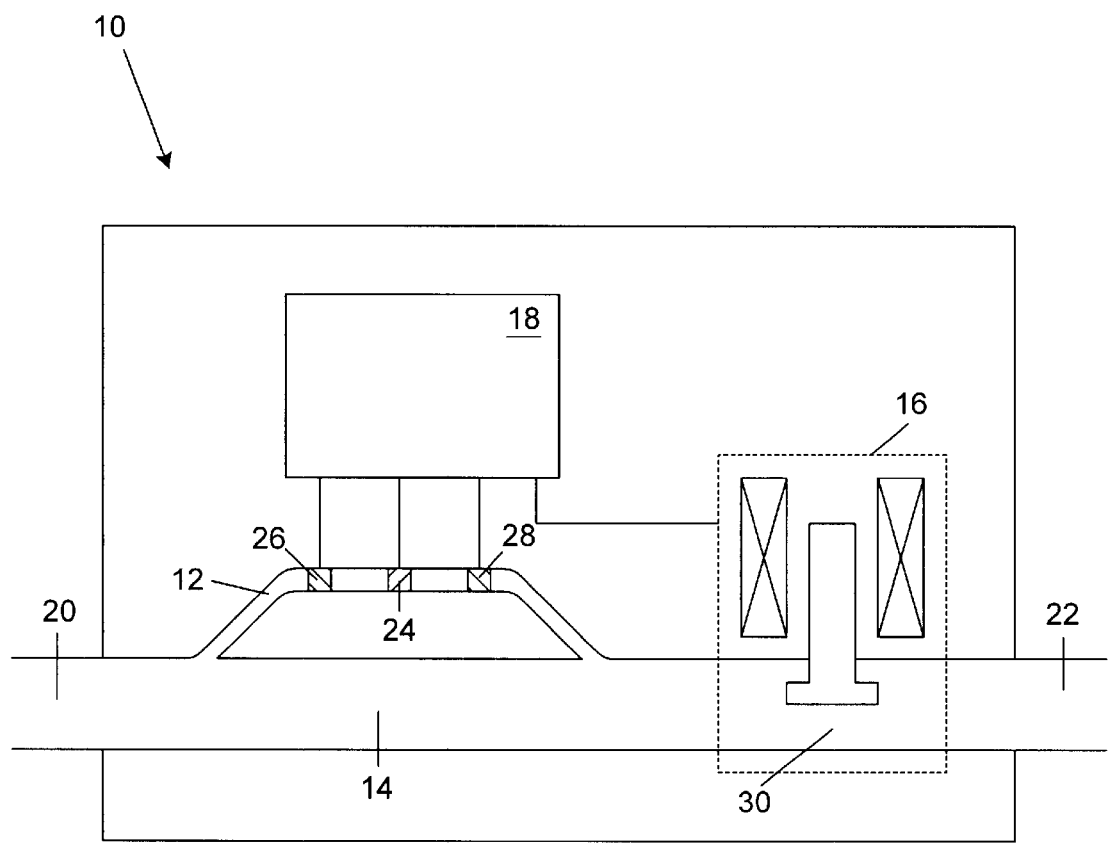
FIG. 1 is a cross-sectional side-view schematic of a MFC.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed. On the contrary, the intention is to cover all modifications, equivalents, and alternatives falling within the spirit and scope of the present invention.

DETAILED DESCRIPTION OF THE PREFERRED EMBODIMENTS

Turning now to the drawings, FIG. 1 is a cross-sectional side-view schematic of a MFC. An example of a MFC is the model number 8100 manufactured by Unit Instruments of Yorba Linda, CA. MFC 10 shown in FIG. 1 is a thermal MFC. MFC 10 includes a sensor tube 12, main flow tube 14, control valve 16, and electronics 18. Gas flows into MFC 10 through conduit 20. A portion of the gas then flows into sensor tube 12 while the remaining gas flows into main flow tube 14. Sensor tube 12 is used to determine the flow rate of gas through MFC 10. Heating coil 24 is wrapped around sensor tube 12 and temperature sensors 26 and 28 are located on sensor tube 12 upstream and downstream of heating coil 24, respectively. Temperature sensor 26 and 28 are typically resistance thermometers. Circuit 18 applies power to heating coil 24 to heat sensor tube 12 and any gas flowing through sensor tube 12. Circuit 18 also monitors the temperatures of sensors 26 and 28. When gas flows through sensor tube 12, more heat is transferred to sensor 28 than to sensor 26 and sensor 28 becomes hotter than sensor 26. The flow rate F of gas through the MFC 10 is then given by $F=(k\ W_h \Delta T)^{1.25}$ where k is a constant that depends on the geometry of sensor tube 12 and main flow tube 14 and the composition of gas flowing through MFC 10, $W_h$ is the power applied to the heater, and $\Delta T$ is the temperature difference between sensors 28 and 26. The manufacturer of the MFC typically includes with the MFC a list of the value of constant k for different gases.

A predetermined flow rate is set for MFC 10. This is typically done by externally supplying a voltage to circuit 18 that is proportional to the predetermined flow rate. This voltage may be either analog or digital signal. Circuit 18 attempts to keep the actual flow rate of gas through MFC 10 the same as the predetermined flow rate. Circuit 18 continually adjusts opening 30 of control valve 16 to maintain the actual flow rate of gas through MFC 10 at the predetermined flow rate. Gas then flows out of MFC 10 through conduit 22. An MFM merely determines the flow rate of a gas through the MFM and does not control the flow rate of a gas. A MFM is the same as MFC 10 except that there is no control valve 16. Both MFCs and MFMs typically have a maximum flow rate that they can control or measure. This is referred to as their full scale range. MFM manufacturers typically specify that MFMs provide accurate results over a range of approximately 5% to 95% of the full scale range. Additionally, MFMs typically provide the most accurate results over a range of approximately 40% to 60% of the full scale range.

Figure 2:
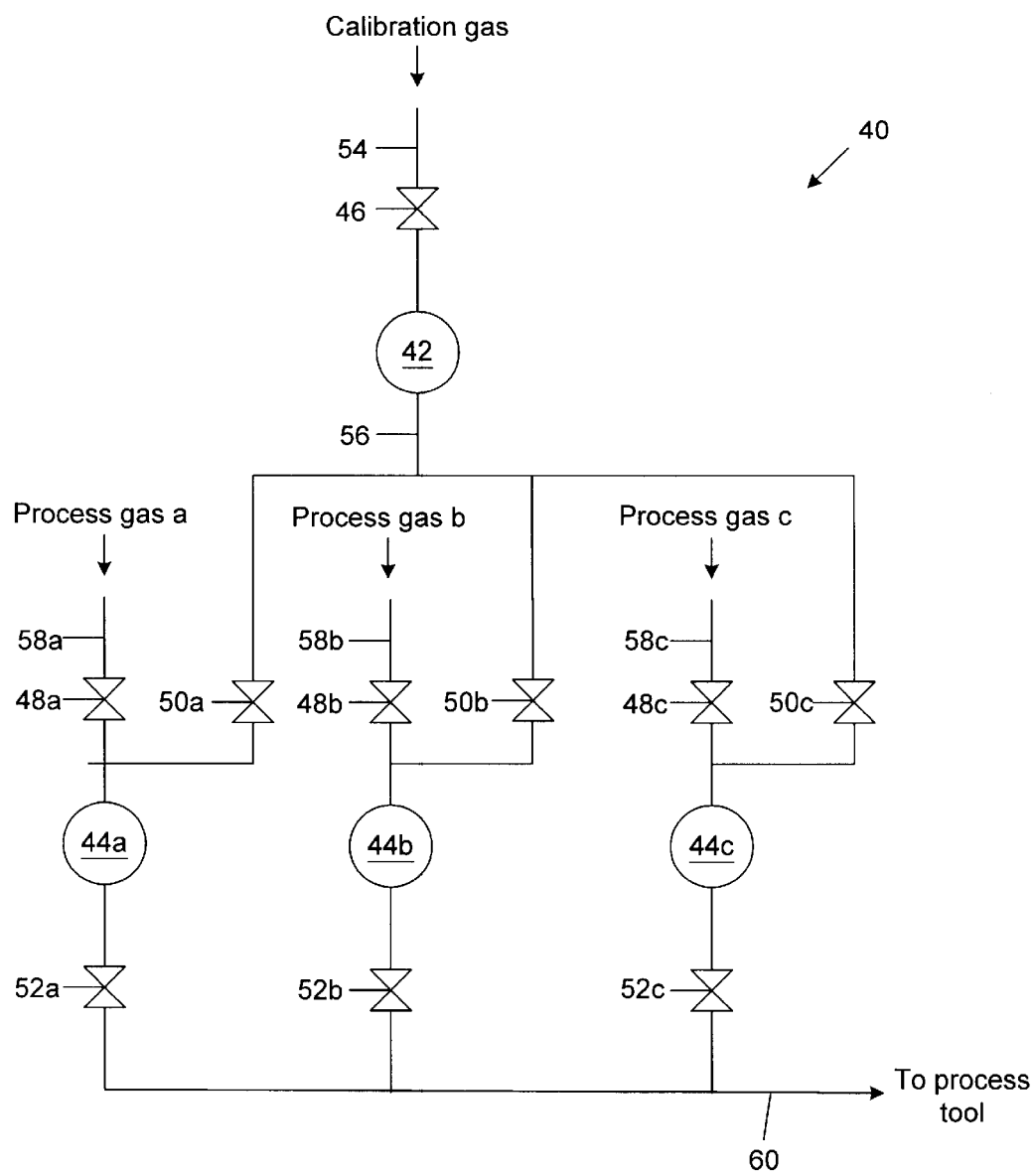
FIG. 2 is a schematic of a gas tray containing a MFM and MFCs.

FIG. 2 is a partial schematic of a gas tray used to distribute process gases to a process tool. Gas tray 40 includes MFM 42 and MFCs 44. Although gas tray 40 is shown having three MFCs 44, gas tray 40 may include more than or less than three MFCs 44. Conduit 54 is adapted to introduce a calibration gas into MFM 42 through valve 46 and conduit 56 is adapted to introduce the calibration gas into MFCs 44 through valves 50. Conduits 58 are adapted to introduce process gas into MFCs 44 through valves 48. MFCs 44 are adapted for introducing process or calibration gas into conduit 60 through valves 52. Conduit 26 is adapted for introducing gases into a process tool (not shown) such as a chemical vapor deposition reactor. The calibration gas may be any non reactive gas such as nitrogen. The process gases may be any of the gases typically used in semiconducting processing such as silane, oxygen, arsine, phosphine, and ammonia.

MFCs 44 may have different full scale ranges since the process tool may require that different process gases be introduced into the process tool at different rates. For example, MFC 44a may have a full scale range of 20 slm, MFC 44b may have a full scale range of 2 slm, and MFC 44c may have a full scale range of 200 sccm. MFM 42 typically will have a full scale range approximately equal to the largest full scale range of MFCs 44. For example, MFM 42 may have a full scale range of 20 slm. For these examples, MFM 42 could accurately calibrate MFC 44a but could not directly calibrate MFC 44c since the full scale range of MFC 44c is less than 5% of the full scale range of MFM 42.

Calibration of a MFC typically involves using a MFM as a standard. Gas is flowed through both the MFC and a MFM. A set flow rate of the MFC is compared to a flow rate measured by the MFM. Any deviation between the set rate and the measure rate is taken as an indication of a change in the calibration of the MFC. The MFC may be calibrated at a single point (e.g., the full scale value of the MFC) or may be calibrated at a series of points over the working range of the MFC.

For the example values of flow rates for MFM 42 and MFCs 44 given above, MFC 44a may be calibrated directly using MFM 42. Initially, all valves in FIG. 2 are closed. Valves 46, 50a, and 52a are then opened. A flow rate is then set on MFC 44a. Calibration gas then flows through both MFM 42 and MFC 44a. The flow rate may be, for example, the full scale value of MFC 44a. The flow rate measured by MFM 42 is then compared to the set flow rate of MFC 44a. If the two values disagree, a calibration factor for MFC 44a can be computed. The calibration factor may simply be a value to multiply the predetermined set rate by such that flow rate of MFC 44a will yield that flow rate through MFM 42. This method may done at additional flow rates to determine the calibration of MFC 44a at multiple points.

MFMs 44b and 44c can not be accurately calibrated using the above procedure. Their full scale flow rates are too low for MFM 42 to calibrate accurately. MFCs 44b and 44c may be accurately calibrated by "gas biasing" MFM 42. Gas may be flowed through MFM 42 at a rate approximately equal to 50% of MFM 42's full scale range, the value at which MFM 42 produces the most accurate reading. Gas may then be flowed through MFC 44b or 44c thereby causing an increase in the gas flow through MFM 42. The change in flow rate through MFM 42 may then be used to calibrate the MFCs.

A method for calibrating MFC 44c will now be shown but this method would also apply to MFC 44b. Initially, all valves in FIG. 2 are closed. Valves 46, 50a, and 52a are then opened. A flow rate is then set on MFC 44a such that the calibration gas flows through MFC 44a and MFM 42 at a rate that is approximately 40% to 60% of the full scale range of MFM 42. The flow rate is preferably approximately 50% of the full scale range of MFM 42. A first flow reading of MFM 42 is measured. Valves 50c and 52c are then opened. A flow rate is then set on MFC 44c. Additional calibration gas now flows through MFM 42 and MFC 44c. The flow rate may be, for example, the full scale value of MFC 44c. A second reading of MFM 42 is measured. The difference of the second and first readings of MFM 42 measured flow rates is compared to the set flow rate of MFC 44c. If the values disagree, a calibration factor for MFC 44c can be computed. The calibration factor may simply be a value to multiply the predetermined set rate by such that flow rate of MFC 44c will yield that flow rate through MFM 42. This method may done at additional flow rates to determine the calibration of MFC 44c at multiple points.

Figure 3:
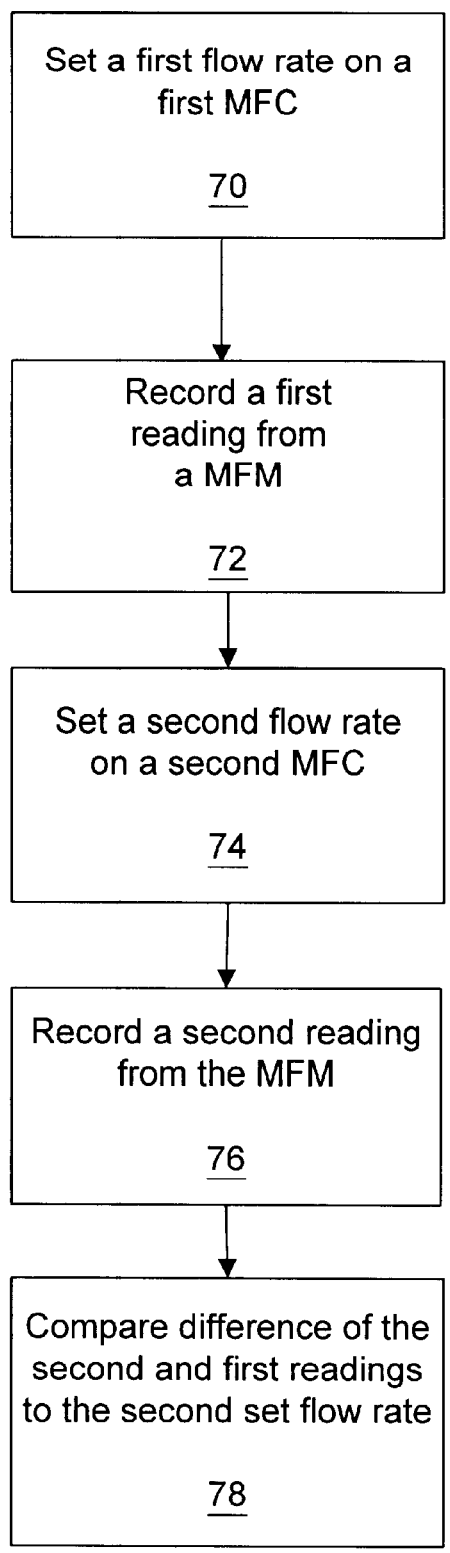
FIG. 3 is a flow diagram of an exemplary procedure for gas flow calibration of a MFC.

FIG. 3 is a flow diagram of an exemplary procedure for gas flow calibration of a MFC. This procedure requires at least a MFM and a first and second MFC. The MFM and the first MFC have full scale ranges that are substantially similar (e.g., within a factor of two of one another). The full scale range of the second MFC (the MFC to be calibrated using this procedure) has a full scale range that is much less (e.g., for example, 10%) than the full scale range of the MFM. Initially, a first flow rate is set on a first MFC (box 70). Gas then flows through the first MFC and a MFM. The flow rate is set such that is approximately 40% to 60% of the full scale range of the MFM. The flow rate is preferably 50% of the full scale range of the MFM. A first reading of the MFM is then recorded (box 72). A second flow rate is then set on a second MFC (box 74). Additional gas then flows through the MFM and the second MFC. A second reading of the MFM is recorded (box 76). The difference of the second and first readings is then compared to the flow rate set on the second MFC (box 78). A calibration factor for the second MFC may then be computed so that the rate gas flows through the MFM will equal the flow rate set by the second MFC. This procedure may be repeated for different set flow rates on the second MFC so that the calibration may be check over a range of flow rates.

Figure 4:
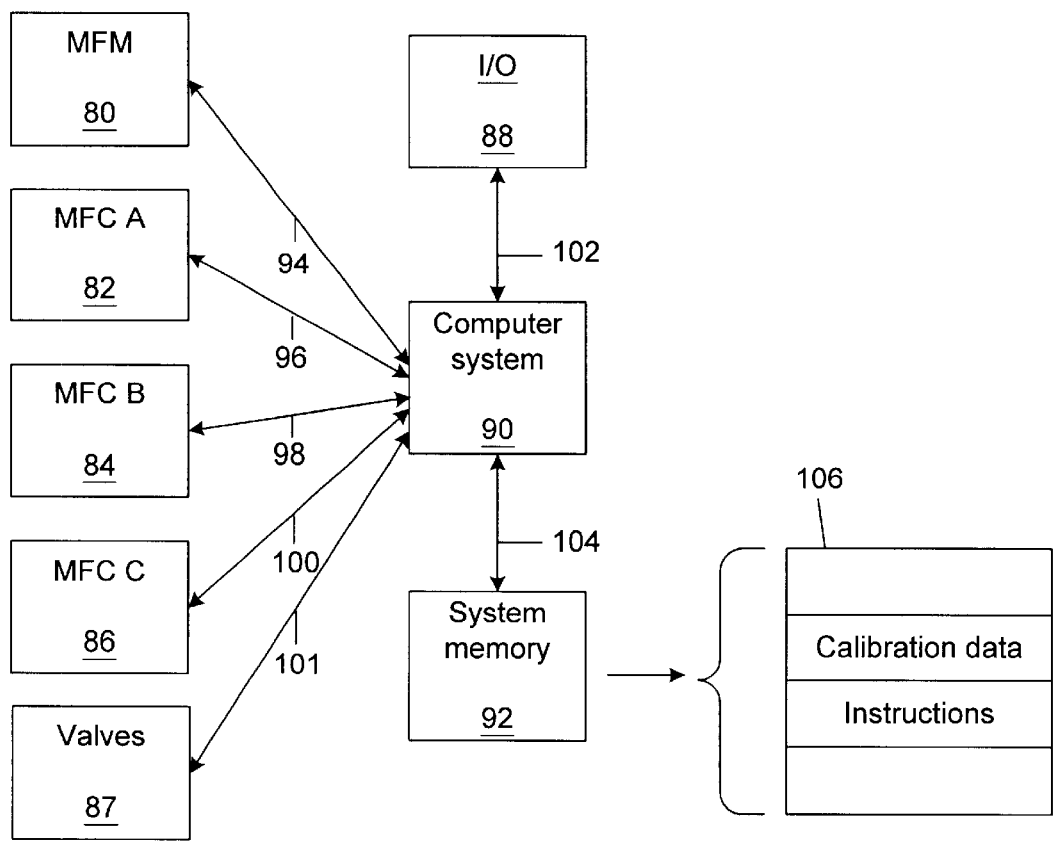
FIG. 4 is an exemplary block diagram of the interconnection of a MFM, MFCs, a set of valves, and a computer system.

FIG. 4 is an exemplary block diagram of the interconnection of a MFM, MFCs, and a computer system. The method described above for gas flow calibration of MFCs may be implemented automatically using a computer system. MFM 80, MFCs 82, 84, and 86, and set of valves 87 are connected to computer system 90 by interfaces 94, 96, 98, 100, and 101, respectively. Although three MFCs are shown, there could more or less than quantity of MFCs connected to computer system 90. Additionally, the MFM, MFCs, and set of valves may be connected together as shown in FIG. 2. At least one MFC has a full scale range substantially similar to MFM 80 while at least one MFC has a full scale range much less than the full scale range of MFM 80. Additionally, computer system 90 is connected to I/O unit 88 by bus 102 and to system memory 92 by local bus 104. I/O unit 88 may include a keyboard and a monitor for users to check on the calibration of the MFCs. System memory 92 is either a volatile or nonvolatile storage medium which may include a hard disk, a floppy disk, a read-only memory, and/or a random access memory in which data and instructions are stored. A portion of the information stored in system memory 92 is shown in memory address space 106. The information in memory address space 102 includes instructions for calibration of the MFCs and a database that contains the results of calibration of the MFCs.

Computer system 90 may operate set of valves 87 to open connections between MFM 80 and the appropriate MFC or MFCs. Computer system 90 can execute the instruction located in memory address space 106 to calibrate MFCs 82, 84, and 86 using the method described above. Each of the MFCs may be calibrated at a single flow rate or a multiple flow rates. Computer system 90 may store the calibration results for each of the MFCs in memory address space 106. Computer system 90 may also execute the instruction located in memory address space 106 to check for drifts in the calibration of MFM 80. For example, if the calibration of all MFCs are found to change by the same amount over the same period of time, it is probably an indication of a drift in the calibration of MFM 80. Computer system 90 can display a warning on I/O unit to inform a users of this drift. Additionally, the instructions may cause computer system 90 to perform a calibration of the MFCs at predetermined intervals.

It will be appreciated by those skilled in the art having the benefit of this disclosure that this invention provides a method for gas flow calibration of MFCs. Further modifications and alternative embodiments of various aspects of the invention will be apparent to those skilled in the art in view of this description. For example, this method could be implemented manually in which readings of the gas flow rate by the MFM are recorded on paper. It is intended that the following claims are interpreted to embrace all such modifications and changes and, accordingly, the specification and drawings are to be regarded in an illustrative rather than a restrictive sense.

What is claimed is:

1. A method for gas flow calibration, comprising:
    setting a first mass flow controller (MFC) such that a gas flows through a mass flow meter (MFM) and the first MFC at a first rate, wherein the first MFC is connected in series to the MFM;
    recording a first reading from the MFM while the gas flows through the MFM at the first rate;
    setting a second MFC such that the gas flows through the MFM at a second rate, wherein the second MFC is connected in parallel to the first MFC, and wherein the parallel combination of the first and second MFC is connected in series to the MFM;
    recording a second reading from the MEM while the gas flows through the MFM at the second rate; and
    comparing a difference of the second and first readings to the setting of the second MFC to determine a calibration of the second MFC.

2. The method of claim 1, wherein the gas comprises nitrogen.

3. The method of claim 1, wherein the first flow rate is approximately 40% to 60% of a full scale range of the MFM.

4. The method of claim 3, wherein the first flow rate is approximately 50% of the full scale range of the MFM.

5. The method of claim 1, wherein a difference of the second and first flow rates is approximately equal to or less than 10% of a full scale range of the MFM.

6. The method of claim 1, wherein a difference of the second and first flow rate is approximately equal to or less than 1% of a full scale range of the MFM.

7. The method of claim 1, wherein said setting a second MFC comprises setting the second MFC to its full scale flow rate.

8. The method of claim 1, further comprising:
    resetting the second MFC such that gas flows through the MFM at a plurality of different rates;
    recording a plurality of readings from the MFM, wherein each of the plurality of readings corresponds to one of the plurality of rates at which the gas flows through the MFM; and
    comparing a difference of each of the plurality of readings and the first reading to each of the plurality of settings of the second MFC to determine the calibration of the second MFC.

9. A system for gas flow calibration, comprising:
    a computer system;
    a mass flow meter (MFM) linked to the computer system;
    a plurality of mass flow controllers (MFCs) linked to the computer system, wherein the plurality of MFCs are connected in parallel to each other, and wherein the plurality of MFCs are connected in series to the MFM;
    a database, stored within the computer system, adapted for maintaining records comprising a plurality of calibrations, wherein each of the calibrations corresponds to one of the plurality of MFCs; and
    a program, adapted for execution on the computer system, to determine the calibration of a second MFC of the plurality of MFCs by:
        setting a first gas flow through a first MFC and the MFM at a first rate;

recording a first reading from the MFM;

setting a second gas flow through the second MFC and the MFM such that a second flow rate through the MFM results;

recording a second reading from the MFM;

comparing a difference of the second and first readings to the setting of the second MFC to determine a calibration of the second MFC; and modifying the calibration data depending on said comparing.

10. The system of claim 9, wherein the first MFC has a full scale range substantially similar to a full scale range of the MFM, and wherein the second MFC has a full scale range substantially less than the full scale range of the MFM.

11. The system of claim 9, wherein the first flow rate is approximately 40% to 60% of a full scale range of the MFM.

12. The system of claim 11, wherein the first flow rate is approximately 50% of the full scale range of the MFM.

13. The system of claim 9, wherein a difference of the second and first flow rates is approximately equal to or less than 10% of a full scale range of the MFM.

14. The system of claim 9, wherein a difference of the second and first flow rate is approximately equal to or less than 1% of a full scale range of the MFM.

* * * * *

UNITED STATES PATENT AND TRADEMARK OFFICE
CERTIFICATE OF CORRECTION

PATENT NO. : 6,332,348 B1  
DATED : December 25, 2001  
INVENTOR(S) : Yelverton et al.

Page 1 of 1

It is certified that error appears in the above-identified patent and that said Letters Patent is hereby corrected as shown below:

Column 6,
Line 20, after the phrase "recording a second reading from the" please delete "MEM" and substitute therefor -- MFM --.

Signed and Sealed this

Seventh Day of May, 2002

Attest:

Attesting Officer

JAMES E. ROGAN
Director of the United States Patent and Trademark Office